US012811170B2

(12) United States Patent
Vulliez et al.

(10) Patent No.: US 12,811,170 B2
(45) Date of Patent: Nov. 24, 2026

(54) GAS DISTRIBUTION ASSEMBLY IN PARTICULAR FOR HIGH-TEMPERATURE SOLID OXIDE ELECTROLYSER CELLS OR FUEL CELLS

(71) Applicant: COMMISSARIAT À L'ÉNERGIE ATOMIQUE ET AUX ÉNERGIES ALTERNATIVES, Paris (FR)

(72) Inventors: Karl Vulliez, Grenoble Cedex (FR); Stéphane Di Iorio, Grenoble Cedex (FR); Amélie Maisse, Grenoble Cedex (FR); Thibault Monnet, Grenoble Cedex (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 3 days.

(21) Appl. No.: 18/438,041

(22) Filed: Feb. 9, 2024

(65) Prior Publication Data

US 2024/0274846 A1 Aug. 15, 2024

(30) Foreign Application Priority Data

Feb. 10, 2023 (FR) ...................................... 2301265

(51) Int. Cl.
*H01M 8/04082* (2016.01)
*C25B 9/60* (2021.01)
*H01M 8/12* (2016.01)

(52) U.S. Cl.
CPC ........... *H01M 8/04216* (2013.01); *C25B 9/60* (2021.01); *H01M 8/12* (2013.01)

(58) Field of Classification Search
CPC ..... C25B 9/60; H01M 8/04216; H01M 8/006; H01M 8/01
See application file for complete search history.

(56) References Cited

U.S. PATENT DOCUMENTS

2004/0048137 A1* 3/2004 Chou .................... F16J 15/102 429/511
2018/0202055 A1* 7/2018 Reytier .................... C25B 1/04
(Continued)

FOREIGN PATENT DOCUMENTS

EP 3016192 A1 5/2016
EP 3667793 A1 6/2020
FR 3075481 A1 6/2019

OTHER PUBLICATIONS

"Modulus of Elasticity for Metals." Modulus of Elasticity for Metals, 2023 (Year: 2023).*
(Continued)

*Primary Examiner* — Ula C Ruddock
*Assistant Examiner* — Olivia Mason Melfi
(74) *Attorney, Agent, or Firm* — McDonald Hopkins LLC

(57) ABSTRACT

A gas distribution assembly comprises a first plate and a second plate parallel with each other, the first plate comprising gas communication orifices. A sealing interface device includes seals disposed around communication orifices and a strut disposed in a coupling plane between the first and second plates. The strut and the seals form a sealing interface having two planes of symmetry perpendicular with each other and perpendicular to the coupling plane, the thickness of the seals before coupling under pressure of the first and second plates being greater than the thickness of the strut. Use for a high-temperature solid oxide electrolyser or fuel cell.

17 Claims, 9 Drawing Sheets

(56) References Cited

U.S. PATENT DOCUMENTS

| | | | | |
|---|---|---|---|---|
| 2018/0237924 | A1* | 8/2018 | Reytier | C25B 15/08 |
| 2019/0013539 | A1* | 1/2019 | Reytier | C25B 9/75 |
| 2019/0252692 | A1* | 8/2019 | Yoon | H01M 8/04089 |
| 2020/0212454 | A1* | 7/2020 | Reytier | C25B 9/75 |
| 2021/0143448 | A1* | 5/2021 | Blackburn | H01M 8/222 |
| 2021/0384543 | A1* | 12/2021 | Palumbo | H01M 8/1246 |

OTHER PUBLICATIONS

Da Woon Jin, Young Joon Ko, Dae Sol Kong, Hyun Ki Kim, Jae-Hyun Ha, Minbaek Lee, Jung-Il Hong, Jong Hoon Jung, Thermal stability and Young's modulus of mechanically exfoliated flexible mica, Current Applied Physics, vol. 18, Issue 12, 2018, pp. 1486-1491, ISSN 1567-1739 (Year: 2018).*

Preliminary Search Report for the French Application No. 2301265 dated Nov. 21, 2023.

* cited by examiner

[Fig. 1A]
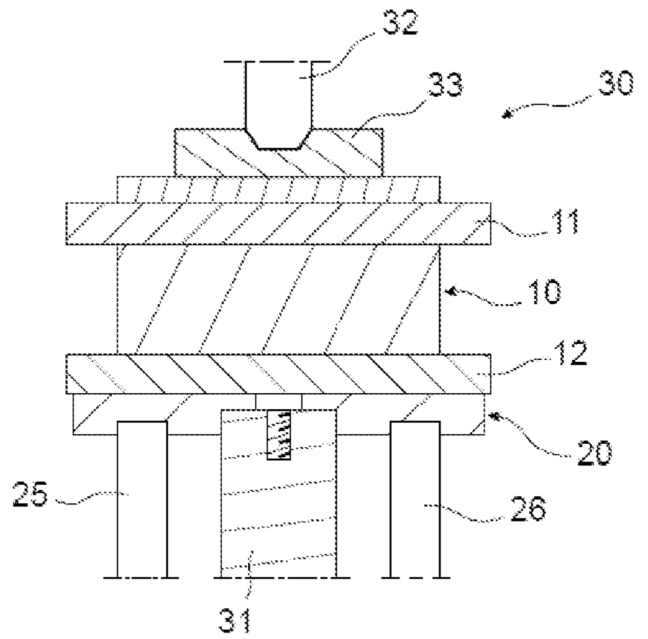
[Fig. 1B]
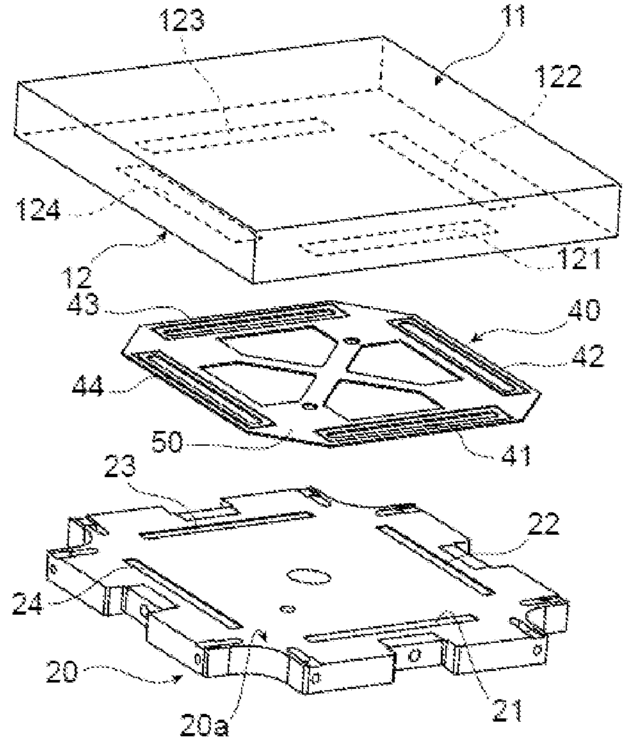

[Fig. 2]
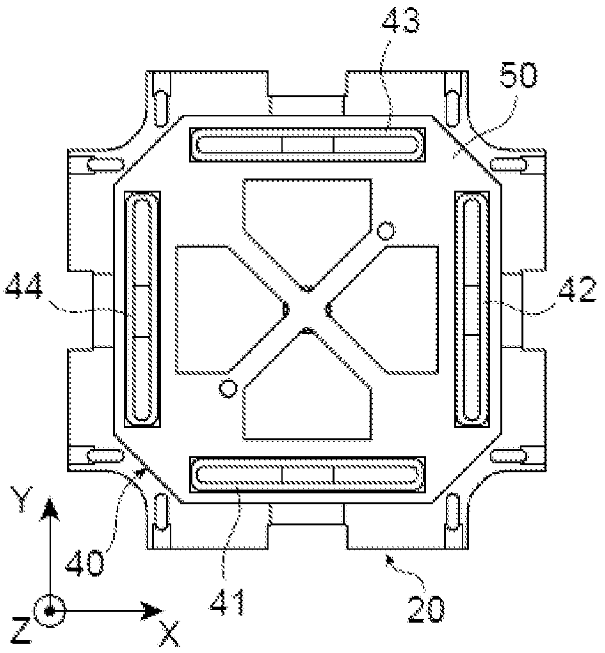
[Fig. 3]
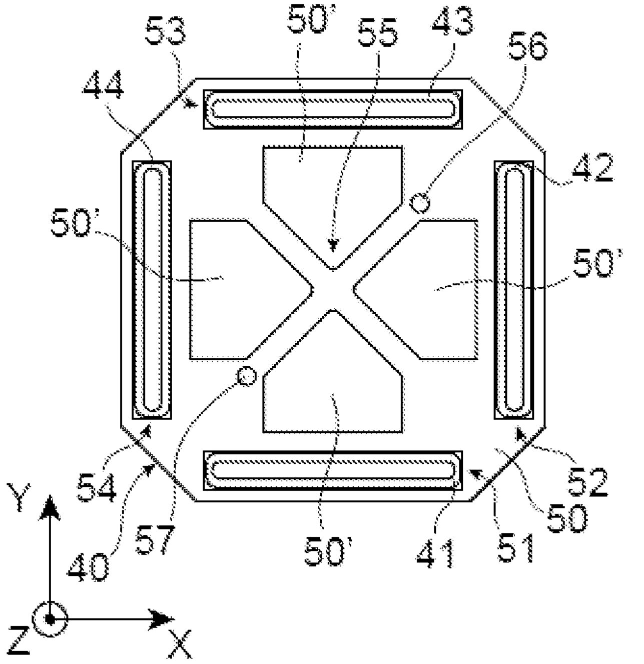

[Fig. 4]
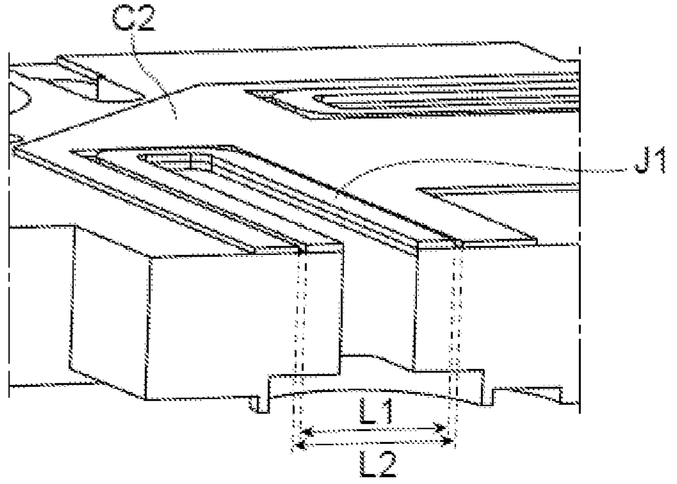
[Fig. 5]
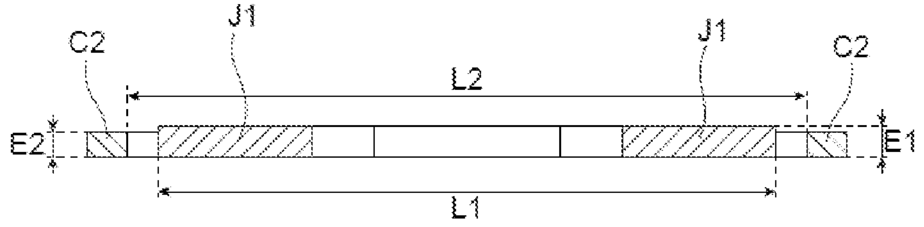
[Fig. 6A]
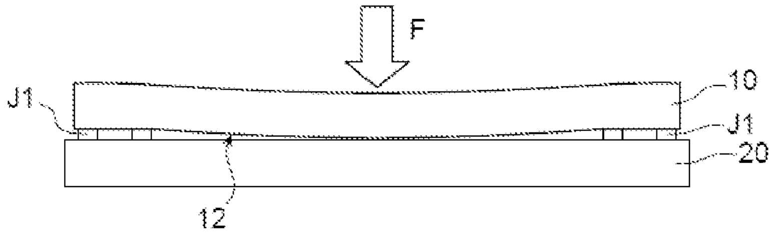

[Fig. 6B]
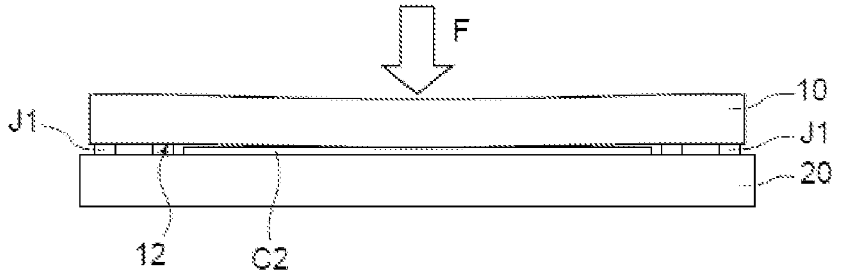
[Fig. 7]
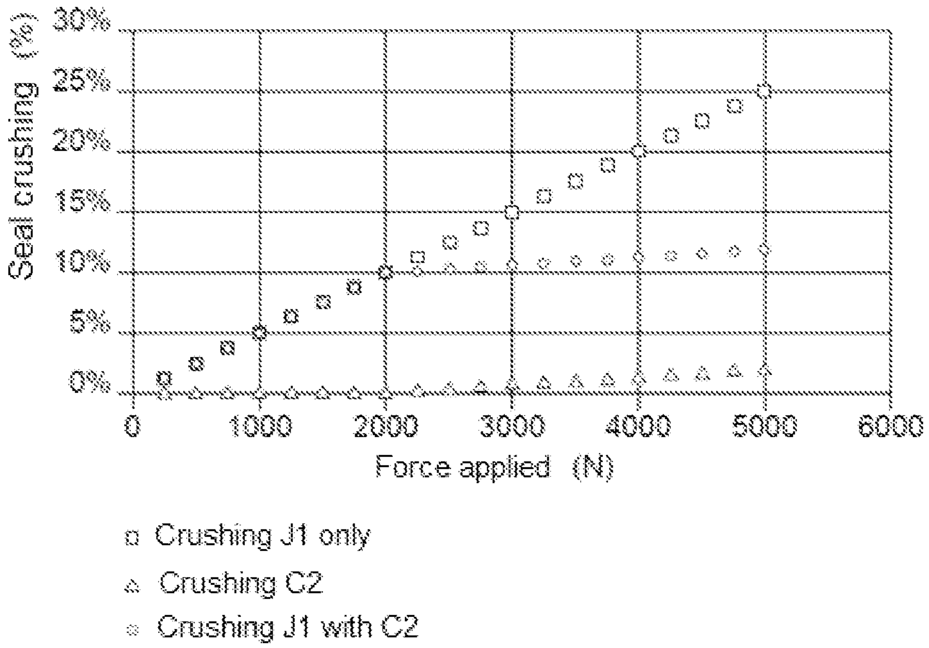

[Fig. 8]
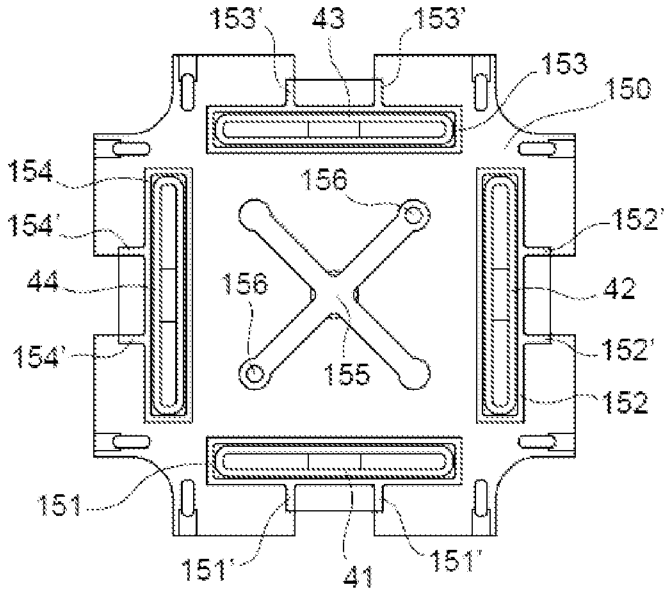
[Fig. 9]
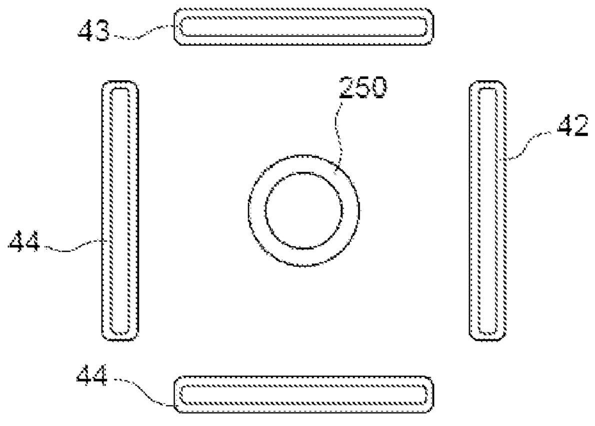

[Fig. 10]
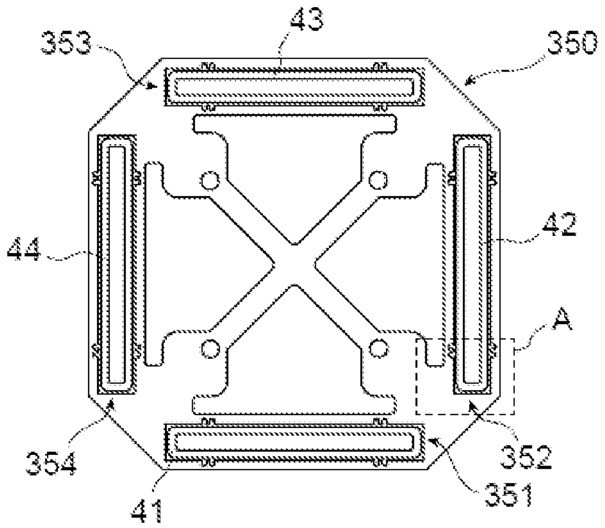
[Fig. 11]
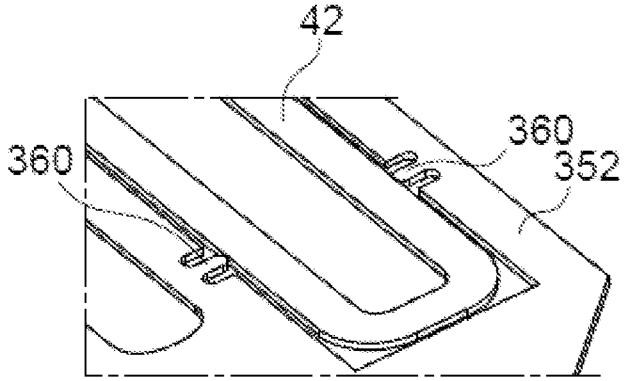

[Fig. 12]
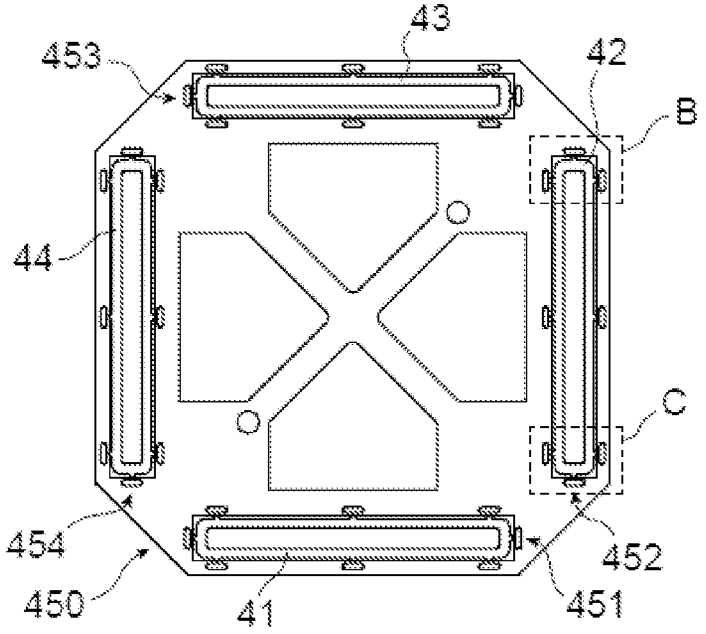
[Fig. 13]
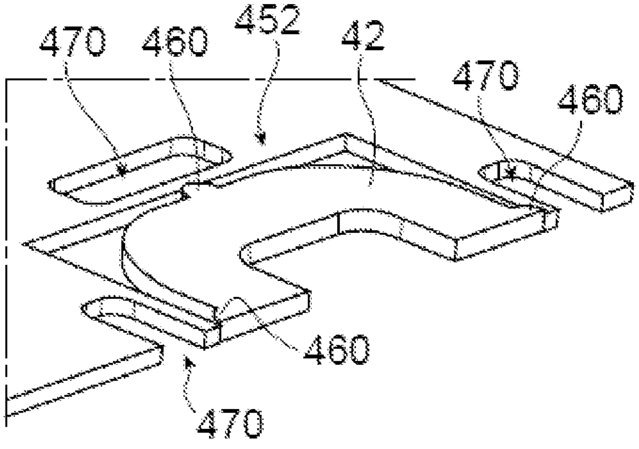

[Fig. 14]
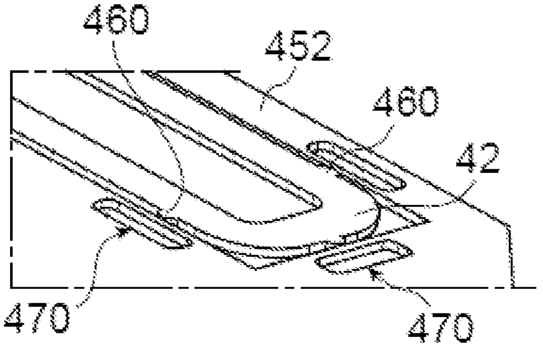
[Fig. 15]
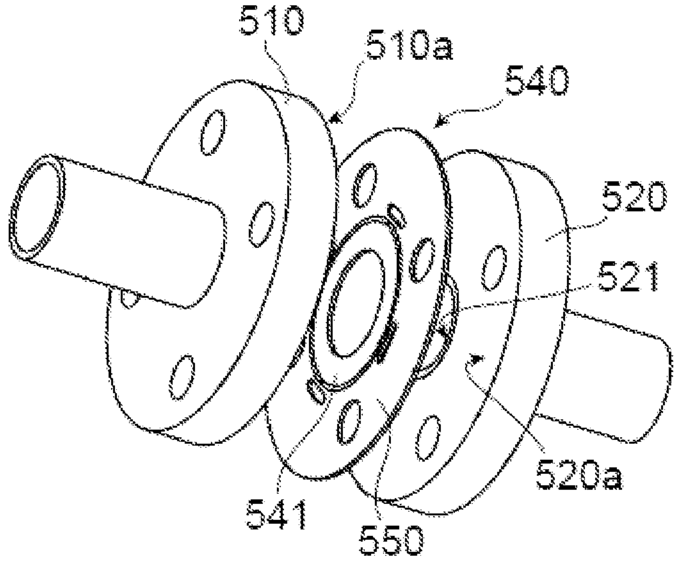

[Fig. 16]
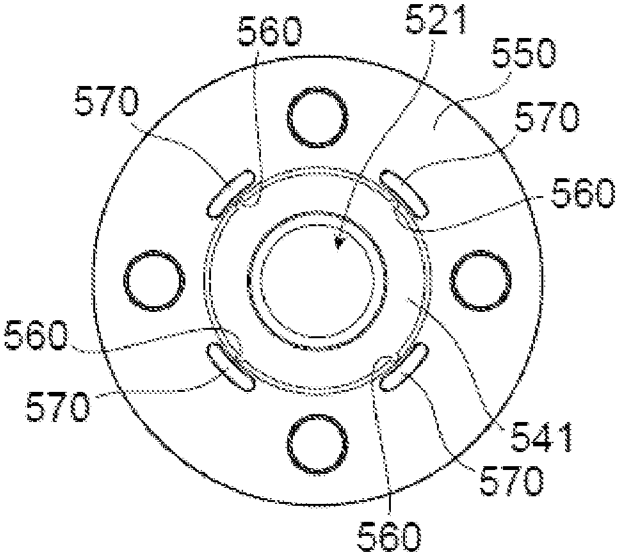

GAS DISTRIBUTION ASSEMBLY IN PARTICULAR FOR HIGH-TEMPERATURE SOLID OXIDE ELECTROLYSER CELLS OR FUEL CELLS

CROSS-REFERENCE TO RELATED APPLICATIONS

This application claims priority from French Patent Application No. 2301265 filed on Feb. 10, 2023. The content of this application is incorporated herein by reference in its entirety.

TECHNICAL FIELD OF THE INVENTION

The present invention relates to a gas distribution assembly in particular for high-temperature solid oxide electrolyser cells or fuel cells.

The present invention relates to the general field of high-temperature electrolysis (HTE) and high-temperature steam electrolysis (HTSE).

More specifically, the invention relates to the field of high-temperature solid oxide electrolyser cells, generally designated using the acronym SOEC. It also relates to the field of high-temperature solid oxide fuel cells, generally designated using the acronym SOFC.

Thus, more generally, the invention relates to the field of SOEC/SOFC-type solid oxide stacks operating at high temperature.

More specifically, the invention relates to a gas distribution assembly comprising a first plate, such as a gas distribution plate, and a second plate, such as an end plate of an SOEC/SOFC-type solid oxide stack operating at high temperature, and a sealing interface device for ensuring the sealing between the first and second plates for gas distribution.

In particular, the invention relates to a sealing interface device for ensuring the sealing of an SOEC/SOFC-type solid oxide stack mounted on a gas distribution plate, also known as a manifold. In a known manner, the gas distribution plate or manifold makes it possible to send and recover the gases for the anodic circuit and the cathodic circuit of the SOEC/SOFC-type solid oxide stack.

PRIOR ART

SOEC/SOFC-type solid oxide stacks, whether on manufacturing/conditioning benches or ultimately integrated in industrial systems, must be connected to gas supply circuits of a fixed installation.

In order to simplify the integration, mounting and dismounting of the stacks, it is known to make such a connection via readily dismountable mechanical interfaces, excluding welded type solutions. It is then necessary to provide sealing between the gas distribution device of the fixed installation and the SOEC/SOFC-type solid oxide stack.

Carrying out such sealing is complex: the seals must withstand high temperatures (of the order of 600° C. to 1000° C.), and furthermore provide electrical insulation between the gas distribution device of the fixed installation and the SOEC/SOFC-type solid oxide stack.

It is known for example to use, to ensure the sealing between the gas supply circuits, seals composed of materials of mineral origin (clay, talc, mica, ceramic, glass-ceramic) compressed via external mechanical clamping systems. Flat compressive seals formed from compacted vermiculite powder are for example used around communication orifices for the gas inlet or outlet of a gas distribution plate or manifold.

These seals provide, besides their sealing function, an electrical insulation function between the mechanical interfaces between which they are mounted.

However, such seals require the application of a significant compressive force to obtain sufficient sealing by densification of the material and adhesion to the opposite interfaces. A clamping stress of the order of one MPa, or several tens of MPa, is required to attain seal compression ratios, making it possible to ensure sealing.

Conversely, excessive crushing of the seal may result in its rupture, which may compromise its sealing function.

Moreover, a clamping stress of several MPa at high temperature may generate a flexural loading on the end plates of the stack, this flexion possibly resulting in a plastic deformation of these end plates, of the stack and/or of the gas distribution plate. When numerous mountings and dismountings of a stack on the gas distribution plate are carried out, in particular on conditioning benches, the flatness of the gas distribution plate or manifold may degrade over time. The risk of degradation increases further when the width of the base of the stacks increases.

The gas distribution plate or manifold, placed in the centre of the conditioning bench is a difficult component to replace. The conditioning of a stack on a deformed manifold plate, in addition to posing sealing problems, will result in increasingly substantial deformations at the end plates of the stacks.

More generally, such deformations may be observed in a gas distribution assembly having parallel plates coupled under pressure by a clamping device, with a sealing interface device including a seal around a communication orifice of one of the plates for the gas inlet or outlet to the other plate.

DESCRIPTION OF THE INVENTION

The aim of the present invention is that of at least partially remedying the drawbacks mentioned above.

For this purpose, the present invention relates to a gas distribution assembly comprising:

- a first plate and a second plate, the first plate comprising at least one communication orifice for the gas inlet or outlet positioned facing a corresponding communication orifice of the second plate, said first and second plates extending parallel with each other;
- a clamping device for coupling under pressure said first and second plates in a coupling plane parallel with said first and second plates; and
- a sealing interface device including at least one seal disposed in said coupling plane around said at least one communication orifice of said first plate.

According to the invention, the sealing interface device comprises a strut disposed in said coupling plane between the first and second plates, said strut and the seal(s) forming a sealing interface having two planes of symmetry perpendicular with each other and perpendicular to said coupling plane, the thickness of the seal(s) before coupling under pressure of said first and second plates being strictly greater than the thickness of said strut.

The strut thus makes it possible to limit the crushing of the seal(s) during the coupling under pressure of the first and second plate of the gas distribution assembly, and therefore the movement of the first and/or second plates crushing the seal(s). The symmetric arrangement of the sealing interface in the coupling plane and the limiting of the crushing of the seal(s) thanks to the strut make it possible to reduce the risks of flexion of the first and second plates of the gas distribution assembly during the coupling under pressure.

The deformation of the first and second plates is thus limited and their flatness may be preserved over time.

The risks of flexion of the plates of the gas distribution assembly are thus reduced during the mechanical compression of the stack and the different elements of the sealing interface device.

The gas distribution assembly may further include one or more of the following features taken separately or in combination.

Advantageously, the surface area formed by the strut in said coupling plane is greater than the surface area formed by the seal(s) in said coupling plane.

The support surface area in the coupling plane formed by the strut, greater than that of the seal(s), makes it possible to avoid excessive crushing of the seal(s), even under a clamping stress greater than the value required to compress the seal(s).

In one embodiment, the stiffness of the material forming the strut is greater than the stiffness of the material forming the seal(s).

The strut thus makes it possible to provide a more rigid mechanical support than the seal(s) in the sealing interface, limiting the movement of the first and second plates during their coupling under pressure. Such a support in the coupling plane makes it possible to limit (geometrically) the bending moment of the first and second plates.

In one advantageous embodiment, the strut includes at least one portion forming a frame extending at the periphery of a seal. This portion forming a frame is combined with the seal to provide reinforced sealing around the communication orifice.

In one preferred embodiment, when the sealing interface device includes several seals, said strut includes a support portion disposed equidistant from said seals.

The support portion of the strut is thus placed at the shortest possible distance from the different seals in the sealing interface. The bending moment applied on the first and/or second plates is thus reduced during their coupling under pressure.

In practice, said strut includes several portions forming a frame extending at the periphery respectively of said several seals.

Advantageously, said strut is formed from a one-piece planar structure including said portions forming a frame.

The one-piece planar structure makes it possible to facilitate the positioning of the strut and the seals in the coupling plane of the first and second plates. By varying the surface area of the one-piece planar structure in the coupling plane and the stiffness of the material forming the one-piece planar structure, it is possible to control the rigidity of the strut according to the sought crushing ratio for the seals.

In practice, the dimensions of an opening formed by each portion forming a frame extending at the periphery of a seal in the coupling plane are strictly greater than the dimensions of said seal in said coupling plane.

A gap is thus formed between the seal and the portion forming a frame of the strut, allowing a free expansion of the seal in the coupling plane during the crushing of the seal.

In one specific embodiment, each portion forming a frame is provided with one or more projecting fingers extending towards said seal and in contact with said seal.

The projecting fingers make it possible to provide a holder for the seal in the strut, facilitating the positioning of the sealing interface device between the first and second plates.

In another specific embodiment, said seal includes at least one excrescence extending in the coupling plane and bearing in a contact zone with the portion forming a frame, said contact zone of the portion forming a frame having a reduced width in the coupling plane in relation to the width of the portion forming a frame outside said contact zone.

The excrescence makes it possible to provide a holder for the seal in the strut, facilitating the positioning of the sealing interface device between the first and second plates.

During the expansion of the seal in the coupling plane, the contact zone of the portion forming a frame, of reduced width, may deform, or even break, preventing the seal from having a reduced crushing at the excrescence bearing against the portion forming a frame.

Preferably, the seal(s) is/are made of a mineral-based material, such as mica, clay or talc.

Similarly, said strut is made of a mineral-based material, such as mica, clay or talc.

The sealing interface is thus well adapted to produce a tight coupling at high temperature (between 600° C. and 1000° C.) while providing an electrical insulation function between the first and second plates.

In practice, the thickness of the seal(s) is between 0.3 and 1 mm, and preferably between 0.5 and 1 mm before coupling under pressure of said first and second plates.

In one specific and non-limiting embodiment, the thickness of the seal(s) is substantially equal to 1 mm and the thickness of said strut is substantially equal to 0.8 mm before coupling under pressure of said first and second plates.

In the gas distribution assembly described above, said first plate may be a gas distribution plate and said second plate may be an end plate of an SOEC/SOFC-type solid oxide stack operating at high temperature.

Further specificities and advantages of the invention will become more apparent in the description given hereinafter.

BRIEF DESCRIPTION OF THE DRAWINGS

In the appended drawings, given by way of non-limiting examples:

FIG. 1A represents, according to a front view block diagram, a gas distribution assembly adapted to implement the present invention;

FIG. 1B represents, according to an exploded perspective block diagram, a gas distribution assembly according to a first embodiment of the invention;

FIG. 2 represents, according to a schematic top view, a sealing interface device associated with a first plate of the gas distribution assembly of FIG. 1;

FIG. 3 is a schematic top view of the sealing interface device of FIG. 2;

FIG. 4 is a perspective view of an enlarged detail of the top left corner of FIG. 2;

FIG. 5 is a diagram illustrating dimension ratios of the sealing interface device of FIG. 3;

FIG. 6A and FIG. 6B are comparative diagrams of the deformation of a gas distribution assembly according to the prior art and according to one embodiment example of the invention;

FIG. 7 schematically represents crushing ratio curves of a sealing interface of a gas distribution assembly according to the prior art and according to one embodiment example of the invention;

FIG. 8 is a schematic top view of a sealing interface device according to a second embodiment;

FIG. 9 is a schematic top view of a sealing interface device according to a third embodiment;

FIG. 10 is a schematic top view of a sealing interface device according to a fourth embodiment;

FIG. 11 is a perspective view of an enlarged detail A of the sealing interface device of FIG. 10;

FIG. 12 is a schematic top view of a sealing interface device according to a fifth embodiment;

FIG. 13 is a perspective view of an enlarged detail B of the sealing interface device of FIG. 12;

FIG. 14 is a perspective view of an enlarged detail C of the sealing interface device of FIG. 12;

FIG. 15 represents, according to an exploded perspective block diagram, a gas distribution assembly according to a second embodiment of the invention;

FIG. 16 is a schematic top view of the sealing interface device of FIG. 15.

Throughout the figures, identical references may denote identical or equivalent elements.

Furthermore, the different parts in the figures are not necessarily on a uniform scale in order to render the figures more readable.

DETAILED DESCRIPTION OF THE INVENTION

An example of a gas distribution assembly according to a first embodiment of the invention will first be described with reference to FIGS. 1A and 1B.

In this first embodiment, the gas distribution assembly is used for a high-temperature tight coupling of an SOEC/SOFC-type solid oxide stack operating at high temperature with a gas distribution plate for the gas inlet and outlet. Hereinafter in the description, the gas distribution plate will also be commonly referred to as manifold.

An SOEC/SOFC-type solid oxide stack 10 has been illustrated very schematically in FIG. 1A.

In a known manner, such a stack 10 includes a plurality of electrochemical cells, each formed from a cathode, an anode and an electrolyte inserted between the cathode and the anode, and several intermediate interconnectors each arranged between two adjacent electrochemical cells. This assembly of electrochemical cells and intermediate interconnectors may also referred to as "stack".

The stack 10 includes an upper end plate 11 and a lower end plate 12, between which the electrochemical cells and the intermediate interconnectors are clamped.

Such a stack is known, for example in document FR 3 075 481, and does not need to be described in more detail here.

The stack 10 is provided to be coupled with a gas distribution plate 20 for the gas inlet and outlet in the SOEC/SOFC-type solid oxide stack 10 operating at high temperature.

The gas distribution plate or manifold 20 comprises at least one communication orifice for the gas inlet or outlet positioned facing an end plate of the stack, and here the lower end plate 12.

In this embodiment, the manifold 20 includes for example four manifold pipes 25, 26 (two can be seen in FIG. 1A) for the gas inlet and outlet, each manifold pipe including a communication orifice 21, 22, 23, 24 opening at the surface 20*a* of the manifold 20 as illustrated in FIG. 1B.

In the embodiment of FIGS. 1A and 1B, the manifold 20 has a surface 20*a* of substantially rectangular or square shape, each communication orifice 21, 22, 23, 24 of the manifold 20 extending parallel respectively with one of the sides of the surface 20*a* of the manifold 20. Each communication orifice 21, 22, 23, 24 of the manifold 20 is intended to be positioned facing a corresponding communication orifice 121, 122, 123, 124 of the lower end plate 12 of the stack 10 so as to allow the fluidic coupling between the stack 10 and the manifold 20 for the gas inlet and outlet.

The implementation of this fluidic coupling between a first plate formed by the manifold 20 and a second plate formed by the lower end plate 12 of the stack 10 requires a clamping device 30 to couple under pressure the manifold 20 and the lower end plate 12, parallel with each other.

As illustrated in FIG. 1A, the clamping device may include a holder 31 intended to support the manifold 20 at its centre, and a support rod 31 associated with a force distribution plate 33 in contact with the upper end plate 11 of the stack 10. The pressurisation of the manifold 20 and of the stack 10 is carried out by applying a force at the support rod 32, the stack 10 and the manifold 20 being clamped between the force distribution plate 33 and the holder 31 of the clamping device 30.

Alternatively, a clamping device may include threaded clamping rods cooperating with nuts and extending through fastening orifices of the manifold 20 and the stack 10. Examples of such a clamping device are described for example in document FR 3 075 481, and it does not need to be described in more detail here.

In order to ensure sealing in a coupling plane extending between the manifold 20 and the lower end plate 12, a sealing interface device 40 is provided as seen in FIG. 1B.

In this application implementing an SOEC/SOFC-type solid oxide stack 10, the sealing interface device must provide high-temperature sealing, i.e. withstanding at least 600° C.-1000° C.

Such a sealing interface device 40 is illustrated in more detail in FIGS. 2 and 3.

It includes at least one or more seal(s) disposed in the coupling plane around each communication orifice 21, 22, 23, 24 of the manifold 20.

In the embodiment illustrated in FIGS. 1 to 3, the sealing interface device 40 comprises four seals 41, 42, 43, 44 disposed respectively around each communication orifice 21, 22, 23, 24 of the manifold 20.

By way of illustration, in this embodiment, each communication orifice 21, 22, 23, 24 of the manifold 20 is formed from an elongated slot-shaped opening, and each seal 41, 42, 43, 44 has an oblong or rectangular shape adapted to extend at the periphery of each communication orifice 21, 22, 23, 24 of the manifold 20.

Each seal 41, 42, 43, 44 is for example a flat seal. Such a seal 41, 42, 43, 44 is produced in plate form, by compacting/rolling a powder made of mineral material.

Each seal 41, 42, 43, 44 is made of a material having electrically insulating properties compatible with the operational constraints of high-temperature solid oxide fuel cells.

Each seal 41, 42, 43, 44 may thus be made of a mineral-based material such as mica, clay or talc. Typically, the seals 41, 42, 43, 44 may be made of mica.

The thickness of the seals 41, 42, 43, 44 is between 0.3 and 1 mm, and preferably between 0.5 and 1 mm. These ranges of thickness values are well adapted for mineral-based materials such as mica or talc for example, usable in high-temperature electrolysis applications. Below 0.5 mm, there is a risk of not compressing the seals sufficiently, for example following flatness defects of the surface 20*a* of the manifold or the bottom end plate 12 of the stack 10, and therefore of not obtaining the required sealing.

Returning to FIG. 2, the thickness of the seals 41, 42, 43, 44 is measured in a direction z perpendicular to the plane (x,y) wherein the surface 20*a* of the manifold 20 extends.

This consists furthermore of the thickness of the seals 41, 42, 43, 44 before applying the compressive stress.

The thickness of the seals 41, 42, 43, 44 is thus given before the clamped mounting of the manifold 20 and the stack 10, i.e. before the coupling under pressure of the surface 20*a* of the manifold 20 and the lower end plate 12 of the stack 10.

Vermiculite type compressive seals require high compressions to make it possible to obtain sufficient sealing for the coupling of the manifold 20 and the stack 10. A compressive stress equal to a few MPa or several tens of MPa is necessary to attain seal compression ratios making it possible to ensure sealing.

In order to limit the deformations induced by these high compressive stresses, in particular at the surface 20*a* of the manifold 20 and the lower end plate 12 of the stack 10, the sealing interface device 40 comprises a strut 50 intended to be disposed in the coupling plane extending between the manifold 20 and the lower end plate 12 of the stack 10.

The thickness of the seals 41, 42, 43, 44 before coupling under pressure is strictly greater than the thickness of the strut 50.

Thus, the strut 50 has a thickness less than the thickness of the seals 41, 42, 43, 44, which makes it possible for the clamping of the stack 10 on the manifold 20 to firstly compress the seals 41, 42, 43, 44. This start of compression will induce the crushing of the seals 41, 42, 43, 44 until the lower end plate 12 of the stack 10 comes to a stop both against the seals 41, 42, 43, 44 and the strut 50. The strut thus has a crushing limiting function, limiting the movement of the lower end plate 12 crushing the seals 41, 42, 43, 44.

Furthermore, as illustrated in FIG. 3, the strut 50 and the seals 41, 42, 43, 44 form a sealing interface having two planes of symmetry perpendicular with each other and perpendicular to the coupling plane defined by the plane ((x,y)) in FIG. 3.

In this embodiment example, the sealing interface device 40 has a plane of symmetry (x,z) and a plane of symmetry (y,z), both perpendicular to the coupling plane ((x,y)) wherein the sealing is carried out.

Thus, the strut 50 makes it possible to limit the crushing of the seals 41, 42, 43, 44 and the movement of the lower end plate 12 symmetrically in the coupling plane ((x,y)).

The strut 50 thus makes it possible to reduce, symmetrically in the coupling plane, the bending moment applied on the plates bearing on the seals 41, 42, 43, 44. The stresses and deformations applied on the manifold 20 and the stack 10, and in particular the lower end plate 12 are reduced.

The risks of flexion of the lower 12 and upper 11 end plates of the stack 10 and the manifold 20 are reduced, in order to ensure the best possible sealing during the mechanical compression of the stack and the different elements of the sealing interface device 40.

The choice of the thickness of the seals 41, 42, 43, 44 and the strut 20 is determined in such a way that the difference in thickness between the seals 41, 42, 43, 44 and the strut 50 is a few tenths, and for example between 1 and 3 tenths when the seals have thicknesses of the order of one millimetre.

Thus, by way of non-limiting example, when the seals 41, 42, 43, 44 have a thickness substantially equal to 1 mm, the thickness of the strut 50 is substantially equal to 0.8 mm before coupling under pressure of the manifold 20 and the stack 10.

A difference in thickness of 0.2 mm between the seals 41, 42, 43, 44 and the strut 50 makes it possible to ensure that the crushing ratio of the seals 41, 42, 43, 44 is of the order of 20% and in any case does not exceed 25%.

Of course, the thickness values and the differences in thickness between the strut 50 and the seals 41, 42, 43, 44 may be chosen according to the maximum crushing ratio sought for the seals 41, 42, 43, 44.

Typically, for a flat seal, a maximum crushing ratio between 10 and 25% of its initial dimension, before coupling under pressure, is preferred.

It is thus possible to control the crushing ratio of the seals 41, 42, 43, 44 and prevent their rupture, which could harm the sealing.

Preferably, in applications implementing an SOEC/SOFC-type solid oxide stack 10, the strut 50 is also made of a mineral-based material, such as mica, clay or talc.

The sealing interface device 40 thus makes it possible to provide a sealing interface well adapted to high temperature and providing suitable electrical insulation.

The material of the strut 50 may be similar or identical to that of the seals 41,42, 43,44.

Among the available materials usable for the tight coupling of an SOEC/SOFC-type solid oxide stack operating at high temperature, there are different grades of vermiculite, obtained by different implementations of the same material. The vermiculite grades have stiffnesses having values that may vary according to a ratio of 1 to 10.

It is noted that the stiffness (in Newtons per metre or N/m) of a body characterises the resistance to elastic deformation of this body. The greater the stiffness, the greater the force to be applied to obtain a given deflection of this body for a given force will be.

Thus, for the same compressive stress, the crushing ratio of one vermiculite grade may be ten times greater than for another vermiculite grade.

The measurement of the stiffness of these mineral materials and their comparison may be implemented by compression testing methods, as specified by the standard ISO 17892-7:2017, which defines a method for determining the uniaxial compressive strength.

Preferably, the stiffness of the material forming the strut 50 may be greater than the stiffness of the material forming the seals 41, 42, 43, 44.

The stiffness of the material forming the strut 50 thus makes it possible to increase the crushing limiting function for the coupling under pressure of the stack 10 and the manifold 20. A strut 50 with a greater stiffness than that of the seals 41, 42, 43, 44 provides a rigid mechanical support at the sealing interface device 40, which blocks the relative movement of the manifold 20 and the lower end plate 12 of the stack 10, limiting de facto the compression of the seals 41, 42, 43, 44 and providing a support making it possible to reduce the bending moment of the facing plates in the coupling plane (x,y).

Thus, it is possible to crush the seals 41, 42, 43, 44 within a specific deformation range, according to the compressive force applied for clamping the gas distribution assembly.

Similarly, the surface area formed by the strut 50 in the coupling plane may be greater than the surface area formed by the seals 41, 42, 43, 44 in this coupling plane (x,y).

The area formed in the coupling plane, corresponding to the plane (x,y) in FIG. 3, corresponds both for the strut 50 and for the seals 41, 42, 43, 44 to the cumulative surface in the plane (x,y) of the surfaces of the different portions of strut 50 or seals 41, 42, 43, 44.

A large surface formed by the strut 50, compared to that formed by the seals 41, 42, 43, 44, in the coupling plane (x,y), makes it possible to ensure, even under a compressive stress largely greater than the required value (for example a few MPa) than the seals 41, 42, 43, 44 are crushed up to a sought crushing ratio, with no risk of over-crushing.

If the materials of the strut 50 and the seals 41, 42, 43, 44 are identical and have the same stiffness, a greater surface area for the strut 50 than for the seals 41, 42, 43, 44 in the coupling plane (x,y) enables the strut 50 to provide a crushing limiting function in respect of the seals 41, 42, 43, 44.

If furthermore, the material of the strut 50 has a stiffness greater than that of the material forming the seals 41, 42, 43, 44, the crushing limiting function of the seals 41, 42, 43, 44 provided by the strut is improved further.

In the embodiment illustrated in FIGS. 1 to 3, the strut 50 is formed from a one-piece planar structure including portions forming a frame 51, 52, 53, 54 extending respectively at the periphery of the seals 41, 42, 43, 44.

The one-piece planar structure may be formed from a one-piece plate including portions forming a frame 51, 52, 53, 54 or as illustrated in FIG. 3, from a plate furthermore including holes 50'. The holes 50' make it possible to limit the support surface formed by the strut 50 in the coupling plane (x,y) while imparting a good rigidity to the sealing interface device 40.

In a non-limiting manner, these holes 50' are here 4 in number, and disposed according to a distribution at 90° in the coupling plane (x,y).

The shape of the holes 50' may be variable and adapted according to the geometry of the different parts of the gas distribution assembly. Preferably, the holes 50' make it possible to retain a surface area formed by the strut 50 greater than the surface area formed by the seals 41, 42, 43, 44.

The shape of the holes 50' may also make it possible to retain at the centre of the one-piece planar structure of the strut 50, a central support portion 55.

Here, in a non-limiting manner, the central support portion 55 has a cross shape.

The central support portion 55 is disposed equidistant from the seals 41, 42, 43, 44 in the sealing interface device 40. It makes it possible to further limit the bending moment created in the lower end plate 12 of the stack 10 and in the manifold 20 for the coupling under pressure.

Such a central support portion 55 in the strut 50 is all the more useful as the seals 41, 42, 43, 44 associated with the communication orifices 21, 22, 23, 34 are placed at the periphery of the manifold 20.

The larger the surface 20*a* of the manifold 20, the greater the risks of deformation. Similarly, the greater the distance between the seals 41, 42, 43, 44, the higher the risks of flexion and deformation.

The one-piece planar structure of the strut 50 as illustrated in FIG. 3 further includes orifices 56, here two in number, allowing the insertion of positioning pins (not illustrated). These positioning pins are mounted in counterbore produced in the surface 20*a* of the manifold 20, and are adapted to be inserted into the orifices 56 of the strut 50 and in the lower end plate 12 of the stack 10 to ensure precise centring and relative positioning of the stack 10, of the sealing interface device 40 and the manifold 20 before their coupling under pressure.

The portions forming a frame 51, 52, 53, 54 make it possible to clamp each seal 41, 42, 43, 44 and provide additional sealing around each communication orifice 21, 22, 23, 24 of the manifold 20.

The mounting of a seal J1 in a portion forming a frame C2 have been illustrated in FIGS. 4 and 5 in more detail. The seal J1 may be any seal 41, 42, 43, 44 and the portion forming a frame C2 corresponds to a portion forming a frame 51, 52, 53, 53 extending at the periphery of a seal 41, 42, 43, 44.

As a general rule, the dimensions of an opening formed by a portion forming a frame C2 extending at the periphery of a seal J1 in the coupling plane (x,y) are strictly greater than the dimensions of the seal J1 in this coupling plane (x,y).

As described above, the portion forming a frame C2 has a thickness E2 less than the thickness E1 of the seal J1, which makes it possible during the application of a compressive force, to firstly compress the seal J1.

In terms of geometry, the width L1 of the seal J1 must be less than the width L2 of the opening formed in the portion forming a frame C2.

Similarly, the length of the seal J1 must be less than the length of the opening formed in the portion forming a frame C2.

Thus, there is a gap between the seal J1 and the portion forming a frame C2, enabling a free radial expansion, in the coupling plane (x,y), of the seal J1 during its crushing.

Preferably, the gap exists all around the seal J1, between the seal J1 and the portion forming a frame C2.

The sealing function of the seal J1 may thus be provided as soon as the strut does not impede obtaining a minimum crushing ratio of the seal J1.

The thickness E1 of the seal J1 being strictly greater than the thickness E2 of the portion forming a frame C2, if the compressive force applied is sufficient, the crushing ratio of the seal J1 will be directly linked with the difference in the thicknesses E1 and E2.

The seal J1 may freely be crushed and deformed in the opening formed by the portion forming a frame C2, until the seal J1 comes to a stop against the portion forming a frame C2 of the strut.

The compared behaviour of a gas distribution assembly as described above has been illustrated schematically in FIGS. 6A, 6B and 7, with or without a strut 50 in the sealing interface device 40.

Thus, when a compressive force F is applied for the clamping coupling of the stack 10 on the manifold 20, the presence of the strut (scenario of FIG. 6B) makes it possible in comparison to the sealing interface without a strut (scenario of FIG. 6A), to limit the flexion and buckling of the different parts, and in particular of the lower end plate 12 of the stack 10.

Indeed, a compressive and clamping force of the stack 10 on the manifold 20, at several MPa and at high temperature in this configuration, may result in a flexural loading on the end plates of the stack 10 or on the manifold 20, capable of deforming the stack 10 positioned on the manifold 20.

The behaviour of the sealing interface device 40 with and without a strut 50 is also illustrated in FIG. 7, representing schematically the crushing ratio curves (as a crushing %) as a function of the force applied (in Newton) on the seals J1 alone or coupled with a strut comprising a portion forming a frame C2 around each seal J1.

It is thus observed that the crushing ratio of the seals J1 alone may attain 25% for example, for a compressive force of 5000 N.

On the other hand, when the seals J1 are associated with a strut comprising a portion forming a frame C2 around each seal J1, the crushing ratio is similar to that of the seals J1 alone at the start of compression, with a compressive force not exceeding approximately 2000 N. Then, the crushing ratio of the seals J1 is reduced by 25% to 12% approximately for a compressive force between 2000 and 5000 N.

As seen in FIG. 7, the crushing of the seals J1 coupled with the strut comprising a portion forming a frame C2 then follows the same crushing slope as the strut comprising a portion forming a frame C2 alone.

The strut 50 thus makes it possible to control the crushing ratio of the seals 41, 42, 43, 44 in the sealing interface device 40 and reduce the flexural stresses in the stack 10, in particular when the strut 50 absorbs the compressive forces at the centre of the coupling plane (x,y).

It is thus advantageous to have a strut 50 formed from a one-piece planar structure because the maximum crushing ratio of the seals 41, 42, 43, 44 may be controlled by varying the surface and/or the stiffness of the strut 50.

The thickness of the strut 50 being less than the thickness of the seals 41, 42, 43, 44, it is possible to crush the seals 41, 42, 43, 44 to a given value, sufficient to ensure sealing in the coupling plane, and without being disturbed by the presence of the strut 50.

By way of non-limiting example, a strut 50 may be used which has an identical surface to the cumulative surface of the seals 41, 42, 43, 44 and formed from a material, such as a vermiculite, of 4 times greater stiffness than the stiffness of the material of the seals 41, 42, 43, 44.

Alternatively, the same material may also be selected for the strut 50 and the seals 41, 42, 43, 44. The only difference between the strut 50 and the seals 41, 42, 43, 44 then lies in the thickness E1 of the seals 41, 42, 43, 44 and the thickness E2 of the strut 50. The strut 50 may be dimensioned such that E2=0.9×E1.

Of course, the invention is not limited to the embodiment examples described above.

In particular, the strut 50 described above is formed from a one-piece planar structure, which makes it possible to facilitate the positioning of the sealing interface device 40 in the coupling plane (x,y).

However, in the embodiment described with reference to FIGS. 1 to 3, flatness defects of the surface 20*a* of the manifold 20 or the lower end plate 12 of the stack 10 may result locally in point supports in the coupling plane (x,y), limiting the crushing ratio of the seals 41, 42, 43, 44. This effect may in particular be amplified if the seals 41, 42, 43, 44 are distant from each other.

In order to remedy this drawback, the strut of the sealing interface device may be formed of several parts.

As illustrated in FIG. 8, the strut 150 includes several portions forming a frame 151, 152, 153, 154 disposed respectively at the periphery of the seals 41, 42, 43, 44.

In this embodiment, each portion forming a frame 151, 152, 153, 154 comprises a rectangular frame portion adapted to surround each seal 41, 42, 43, 44 and tongues 151', 152', 153', 154' for handling the portions forming a frame 151, 152, 153, 154, in particular for their mounting around the seals 41, 42, 43, 44 on the surface 20*a* of the manifold 20.

In this embodiment example, the strut 150 furthermore includes a central support portion 155 disposed equidistant from the seals 41, 42, 43, 44.

The central support portion 155 is disposed at the centre of the surface 20*a* of the manifold 20 and is formed from a four-armed cross disposed in the coupling plane x, y.

The central support portion 155 as illustrated in FIG. 8 further includes orifices 156, here two in number, allowing the insertion of positioning pins (not illustrated). These positioning pins are mounted in counterbores produced in the surface 20*a* of the manifold 20, and are adapted to be inserted into the orifices 156 of the central support portion 155 of the strut 150 and in the lower end plate 12 of the stack 10 to ensure precise centring and relative positioning of the stack 10, of the central support portion 155 and the manifold 20 for coupling under pressure.

The central support portion 155 makes it possible to limit the bending moment created in the lower end plate 12 of the stack 10 and in the manifold 20 for the coupling under pressure.

In FIG. 8, the strut 150 thus consists of the four portions forming a frame 151, 152, 153, 154 and the central support portion 155. It has similar features to those described above in relation to FIGS. 1 to 5 in terms of usable material, stiffness and surface area in the coupling plane (x,y) as a function of the features of the seals 41, 42, 43, 44.

The thickness E2 of the portions forming a frame 151, 152, 153, 154 and the central support portion 155 is identical and the thickness E2 of the different parts forming the strut 150 is strictly less than the thickness E1 of the seals 41, 42, 43, 44.

In this embodiment, the portions forming a frame 151, 152, 153, 154 and the central support portion 155 make it possible to limit the bending moment 10 and the manifold 20.

Moreover, when the portions forming a frame 151, 152, 153, 154 are formed from frames having a small cross-section, and for example substantially equal or similar to that of the seals 41, 42, 43, 44, the portions forming a frame 151, 152,153, 154 may be subjected to compressive stresses making it possible to compress them sufficiently to provide a second sealing barrier, complementary with that formed by each seal 41, 42 43, 44 around each communication orifice 21, 22, 23, 24 of the manifold 20.

In another embodiment illustrated in FIG. 9, when the sealing interface device 40 includes several seals 41, 42, 43, 44, the strut may include only one support portion 250 disposed equidistant from the seals 41, 42, 43, 44.

In the embodiment illustrated in FIG. 9, the support portion 250 forms a support block disposed at the centre of the coupling plane (x,y) of the manifold 20 and the stack 10. By way of non-limiting example, the support portion 250 may be washer-shaped 250.

The strut thus formed from a washer-shaped support portion 250 has similar features to those described above in relation to FIGS. 1 to 5 in terms of usable material, stiffness and surface area in the coupling plane (x,y) as a function of the features of the seals 41, 42, 43, 44.

The thickness E2 of the washer-shaped support portion 250 is strictly less than the thickness E1 of the seals 41, 42, 43, 44.

The washer-shaped support portion 250 thus provides a crushing limiting function, limiting once the support is established on the washer the movement of the lower end plate 12 of the stack towards the surface 20*a* of the manifold 20. The support portion 250 being equidistant from the seals 41, 42, 43, 44, the distance between each support point in the coupling plane, between the support portion 250 and the seals 41, 42, 43, 44, is the least possible. The bending moment created in the lower end plate 12 of the stack 10 is thus reduced accordingly.

Of course, the washer shape for the support portion 250 is illustrative and could be replaced by a disk or quadrilateral shape.

Advantageous mounting examples of the seals 41, 42, 43, 44 in a strut 350, 450 formed from a one-piece planar structure as described above with reference to FIGS. 1 to 5 will now be described with reference to FIGS. 10 to 14.

The struts 350, 450 illustrated in FIGS. 10 to 14 are similar to that described with reference to FIGS. 1 to 5 and have substantially the same shapes and features as those described above with reference to FIGS. 1 to 5.

A strut 350, 450 having a one-piece planar structure makes it possible to facilitate the positioning of the sealing interface device 40 in the coupling plane (x,y). By further mounting the seals 41, 42, 43, 44 in the strut 350, 450, the operation for installing the seals 41, 42, 43, 44 around each orifice 21, 22, 23, 24 may be simplified.

As illustrated in FIGS. 10 and 11, the strut 350 includes several portions forming a frame 351, 352, 353, 354 around each seal 41, 42, 43, 44.

Cut-outs of the strut 350 at the portions forming a frame 351, 352, 353, 354 are provided to create one or more projecting fingers 360.

Thus, each portion forming a frame 351, 352, 353, 354 is provided with one or more projecting fingers 360 extending towards a seal 41, 42, 43, 44 and in contact with this seal 41, 42, 43, 44.

In the embodiment illustrated in FIGS. 10 and 11, each portion forming a frame 351, 352, 353, 354 includes four fingers 360, distributed pairwise on each side of a seal 41, 42, 43, 44 lengthwise and disposed facing each other in twos. The fingers 360 thus form four holding supports or pins, holding the seal 41, 42, 43, 44 inside the portion forming a frame 351, 352, 353, 354.

The fingers 360 preferably provide a point support of the seals 41, 42, 43, 44 and facilitate the positioning of the strut 350 and the seals 41, 42, 43, 44 on the surface 20*a* of the manifold 20.

In addition, a spot of glue or adhesive may be added at the point support zone, in addition to the simple mechanical support formed by the fingers 360 against the seals 41, 42, 43, 44.

In a further embodiment, the holding elements may be formed on the side of the seals 41, 42, 43, 44.

As illustrated in FIGS. 12, 13 and 14, the strut 450 includes several portions forming a frame 451, 452, 453, 454 around each seal 41, 42, 43, 44.

Each seal 41, 42, 43, 44 includes at least one excrescence 460 extending in the coupling plane (x,y) and bearing in a contact zone with the portion forming a frame 451, 452, 453, 454 surrounding it.

In the embodiment illustrated in FIGS. 12 to 14, each seal 41, 42, 43, 44 includes eight excrescences 460 disposed symmetrically around the seal 41, 42, 43, 44.

In this embodiment, and by way of non-limiting example, each seal 41, 42, 43, 44 includes six excrescences 460 distributed pairwise on each side of a seal 41, 42, 43, 44, lengthwise, and disposed facing each other in twos, and two excrescences 460 disposed at the ends of the seal 41, 42, 43, 44.

Of course, the number of excrescences 460 around the seals 41, 42, 43, 44 and their distribution are merely examples and may vary according to the shape and the dimensions of the seals 41, 42, 43, 44.

The excrescences 460 are adapted to form holding supports of each seal 41, 42, 43, 44 in the portion forming a frame 451, 452, 453, 454 surrounding it.

To ensure an expansion of the seal 41, 42, 43, 44 for its crushing during the coupling under pressure of the stack 10 and the manifold 20, the portions forming a frame 451, 452, 453, 454 are machined in such a way that the latter do not oppose the expansion of the seal 41, 42, 43, 44 and induce locally a sub-crushing of the seal 41, 42, 43, 44.

In practice, the contact zone of the portion forming a frame 451, 452, 453, 454 with an excrescence 460 has a reduced width in the coupling plane (x,y) with respect to the width of the portion forming a frame 451, 452, 453, 454 outside the contact zone.

One manner of proceeding is that of creating facing each excrescence 460 an embrittlement zone in the form of a machining of the portion forming a frame 451, 452, 453, 454, leaving a free space behind the strip of reduced width of the portion forming a frame 451, 452, 453, 454.

In the embodiment illustrated in FIGS. 12 to 14, each portion forming a frame 451, 452, 453, 454 includes facing machined recesses 470 of each contact zone of the portion forming a frame 451, 452, 453, 454 with an excrescence 460 of the seal 41, 42, 43, 44.

The compression of the seal 41, 42, 43, 44 and its expansion create a radial force in the coupling plane (x,y), generating stresses in the contact zone, which is thus capable of deforming, or breaking. The free space located at the contact zone thanks to the recess 470 enables the strip of reduced width of the portion forming a frame 451, 452, 453, 454 to be moved away during its deformation or after its rupture, without generating local extra thickness at the seal 41, 42, 43, 44.

More generally, the invention as described above may be implemented for any type of flat seal geometry inserted between two parallel flanges. The shape of the sealing interface device may be very variable, dependent on the shape of the plates implemented in the coupling plane.

An example of implementation for standard PN6 type flanges has been illustrated in FIGS. 15 and 16.

In high-temperature electrolysis (HTE) applications, this type of flange 510, 520 is equipped with a flat seal 541, for example made of vermiculite.

Each flange 510, 520 includes an end plate 510*a*, 520*a* wherein a communication orifice for the gas inlet or outlet opens. The end plates 510*a*, 520*a* are parallel with each other and define between them a coupling plane for the coupling under pressure by a clamping device (not illustrated) of the two flanges 510, 520.

A flat seal 541 is thus disposed in this coupling plane around a communication orifice 521 of an end plate 510*a* of a first flange 510.

In this embodiment, the communication orifice 521 is circular and the flat seal 541 is formed from a washer.

The sealing interface device 540 comprises, besides the flat seal 541, a strut 550 disposing the coupling plane between the two end plates 510*a*, 520*a* of the flanges 510, 520.

As seen in FIG. 16, the strut 550 and the flat seal 541 form a sealing interface having two planes of symmetry perpendicular with each other and perpendicular to the coupling plane.

As described above for the other embodiments, the thickness of the seal 541 before coupling under pressure of the two flanges 510, 520 is strictly greater than the thickness of the strut 550.

In the embodiment illustrated in FIGS. 15 to 16, the strut 550 is formed from a washer around the flat seal 541, thus forming a frame portion extending respectively at the periphery of the flat seal 541.

The strut 550 thus consisting of a washer shape has similar features to those described above in relation to FIGS. 1 to 5 in terms of usable material, stiffness and surface area in the coupling plane (x,y) as a function of the features of the flat seal 541.

In this embodiment, the washer-shaped strut 550 has a crushing limiting function in respect of the flat seal 541.

It avoids having to control the clamping torque during the mounting under pressure of the flanges 510, 520. The strut 550 avoids attaining an overly high crushing ratio of the flat seal 541, which would impede the sealing of the mounting of the flanges 510, 520.

As described above with reference to FIGS. 10 to 14, the strut 550 may include means for holding the flat seal 541 in position inside the frame formed by the washer-shape strut, which facilitates its mounting and its positioning between the two flanges 510, 520, in particular when the coupling plane between the two end plates 510*a*, 520*a* of the two flanges is in a vertical plane. The centring of the flat seal 541 is thus facilitated.

In the embodiment illustrated in FIGS. 15 and 16, the flat seal 541 includes excrescences 560 extending in the coupling plane and bearing in a contact zone with the portion forming a frame of the strut 550 surrounding it.

By way of example, the flat seal 541 includes four excrescences 560 disposed symmetrically around the flat seal 541, and for example along two perpendicular diameters of the washer-shaped flat seal 541.

Of course, the number of excrescences 560 around the seal 541 and their distribution may vary according to the shape and the dimensions of the flat seal 541.

As described with reference to FIGS. 12 to 14, the excrescences 560 are adapted to form holding supports of the seal 541, 42, 43, 44 in the strut 550. To ensure an expansion of the flat seal 541 during its crushing during the coupling under pressure of the two flanges 510, 520, the strut 550 includes facing machined recesses 570 of each contact zone of the strut 550 with an excrescence 560 of the flat seal 541. The features and advantages of this holding configuration are similar to those described with reference to FIGS. 12 to 14.

Alternatively, the means for holding the flat seal 541 in position inside the frame formed by the washer-shaped strut 550, may be formed by projecting fingers (not illustrated) on the strut 550, extending towards the flat seal 541 and in contact with the flat seal 541. Such a holding configuration has equivalent features and advantages to those described with reference to the embodiment of FIGS. 10 and 11.

Thanks to these holding means, the positioning and centring of the flat seal 541, coupled with the strut 550, are facilitated in the coupling plane. The strut 550 also makes it possible to ensure good electrical insulation and provide a second sealing barrier around the flat seal 541.

Of course, the present invention is not limited to the embodiment examples given above.

In particular, the sealing interface device may be applicable to any high-temperature and low-pressure applications. It may equip any type of gas distribution assembly implementing different flat seal geometries inserted between two parallel flanges or plates.

The invention claimed is:

1. A gas distribution assembly comprising:

a first plate and a second plate, the first plate comprising at least one communication orifice for a gas inlet or outlet positioned facing a corresponding communication orifice of the second plate, said first and second plates extending parallel with each other;

a clamping device configured to move said first and second plates between a first configuration and a second configuration, wherein in said first configuration, said first and second plates are not coupled under pressure via said clamping device, and wherein in said second configuration, said first and second plates are coupled under pressure via said clamping device in a coupling plane parallel with said first and second plates; and a sealing interface device including at least one seal disposed in said coupling plane around said at least one communication orifice of said first plate, wherein the sealing interface device comprises a strut disposed in the same coupling plane as the at least one seal between the first and second plates, said strut and the at least one seal forming a sealing interface having two planes of symmetry, perpendicular with each other and perpendicular to said coupling plane when said first and second plates are in said second configuration, wherein a thickness of the at least one seal is greater than a thickness of said strut when said first and second plates are in said first configuration, wherein said strut includes at least a portion forming a frame extending around said at least one seal, and to a periphery of said at least one seal, and wherein the sealing interface device includes several seals, said strut including a support portion disposed equidistant from said several seals such that said support portion is at a shortest distance from the several seals in said sealing interface device thereby reducing a bending moment applied on the first and/or second plate coupled under pressure in said second configuration.

2. The gas distribution assembly according to claim 1, wherein a surface area formed by the strut in said coupling plane is greater than a surface area formed by the at least one seal in said coupling plane.

3. The gas distribution assembly according to claim 1, wherein a stiffness of a material forming the strut is greater than a stiffness of a material forming the at least one seal.

4. The gas distribution assembly according to claim 1, wherein said strut includes several portions forming a frame extending at respective peripheries of said several seals.

5. The gas distribution assembly according to claim 4, wherein said strut is formed from a one-piece planar structure including said several portions forming said frame.

6. The gas distribution assembly according to claim 1, wherein dimensions of an opening formed by each portion forming said frame in the coupling plane are greater than dimensions of said at least one seal in said coupling plane.

7. The gas distribution assembly according to claim 6, wherein each portion forming said frame is provided with one or more projecting fingers extending towards said at least one seal and in contact with said at least one seal.

8. The gas distribution assembly according to claim 6, wherein said at least one seal includes at least one excrescence extending in the coupling plane and bearing in a contact zone with the at least one portion forming said frame, said contact zone having a reduced width in the coupling plane in relation to a width of the at least one portion forming said frame outside said contact zone.

9. The gas distribution assembly according to claim 1, wherein the at least one seal is made of a mineral-based material.

10. The gas distribution assembly according to claim 1, wherein said strut is made of a mineral-based material.

11. The gas distribution assembly according to claim 1, wherein the thickness of the at least one seal is between 0.3 and 1 mm, when said first and second plates are in said first configuration.

12. The gas distribution assembly according to claim 11, wherein the thickness of the at least one seal is equal to 1 mm and the thickness of said strut is equal to 0.8 mm, when said first and second plates are in said first configuration.

13. The gas distribution assembly according to claim 1, wherein said first plate is a gas distribution plate and said second plate is an end plate of an SOEC-type solid oxide stack operating at a temperature between 600° C. and 1000° C.

14. The gas distribution assembly according to claim 9, wherein said mineral-based material is mica, clay or talc.

15. The gas distribution assembly according to claim 10, wherein said mineral-based material is mica, clay or talc.

16. The gas distribution assembly according to claim 11, wherein the thickness of the at least one seal is between 0.5 and 1 mm when said first and second plates are in said first configuration.

17. The gas distribution assembly according to claim 1, wherein said first plate is a gas distribution plate and said second plate is an end plate of an SOFC-type solid oxide stack operating at a temperature between 600° C. to 1000° C.

* * * * *